Jan. 31, 1961
R. F. BECKER
2,969,932
REEL LOCK WITH QUICK RELEASE
Filed Nov. 6, 1959
2 Sheets-Sheet 1
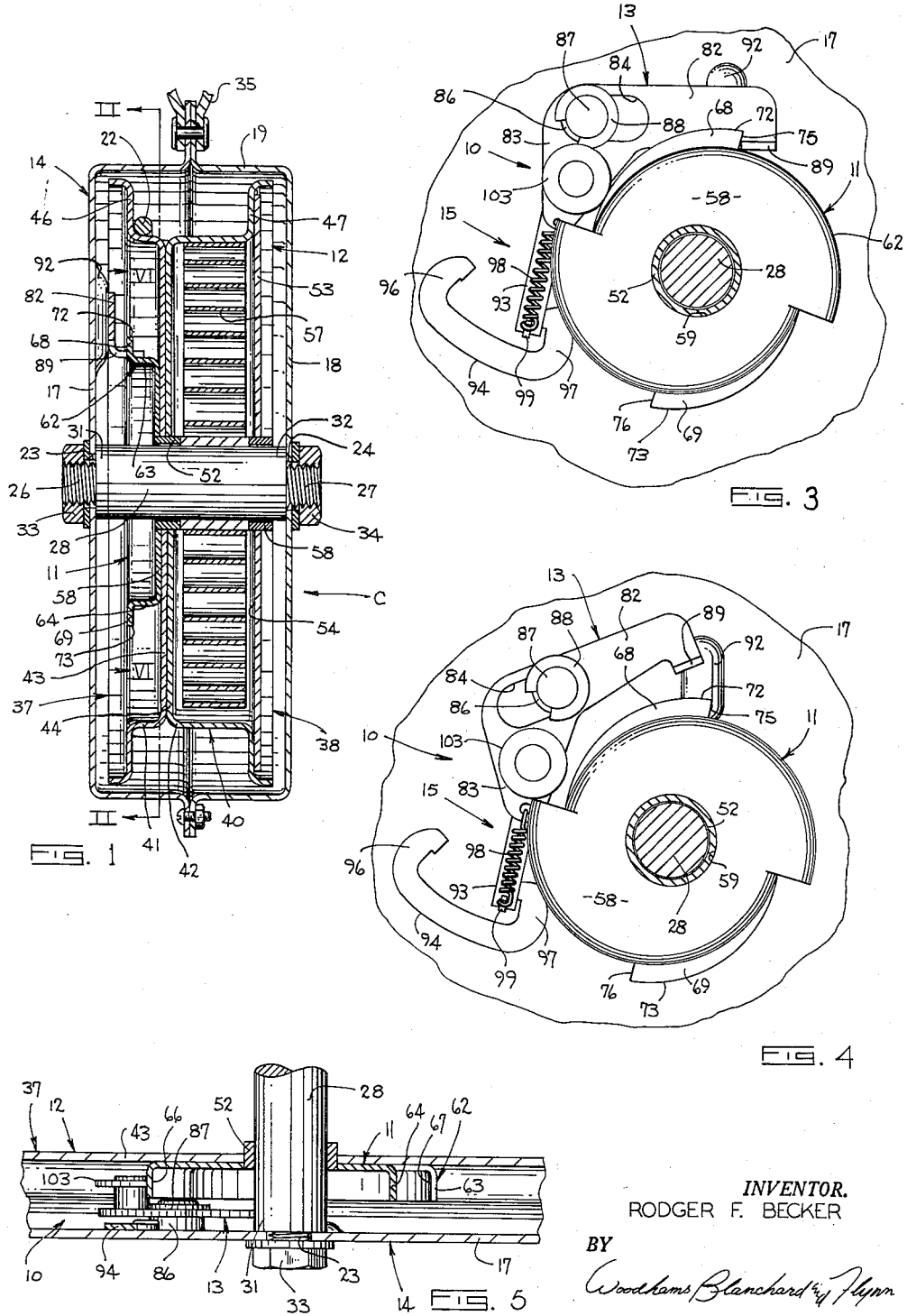
INVENTOR.
RODGER F. BECKER
BY
Woodhams, Blanchard & Flynn
ATTORNEYS Jan. 31, 1961   R. F. BECKER   2,969,932
REEL LOCK WITH QUICK RELEASE
Filed Nov. 6, 1959   2 Sheets-Sheet 2
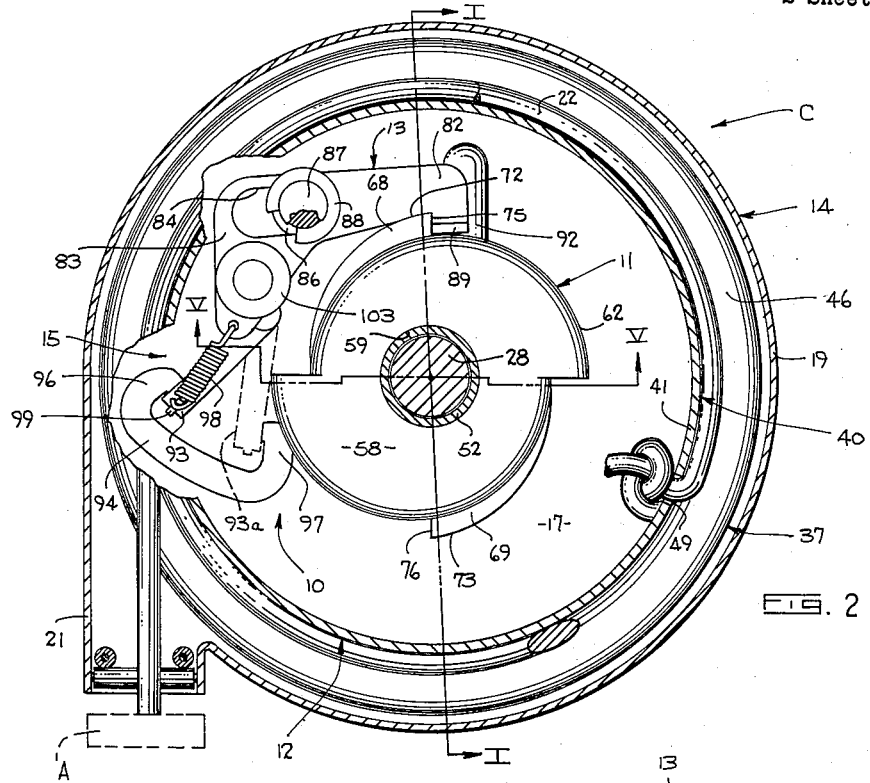
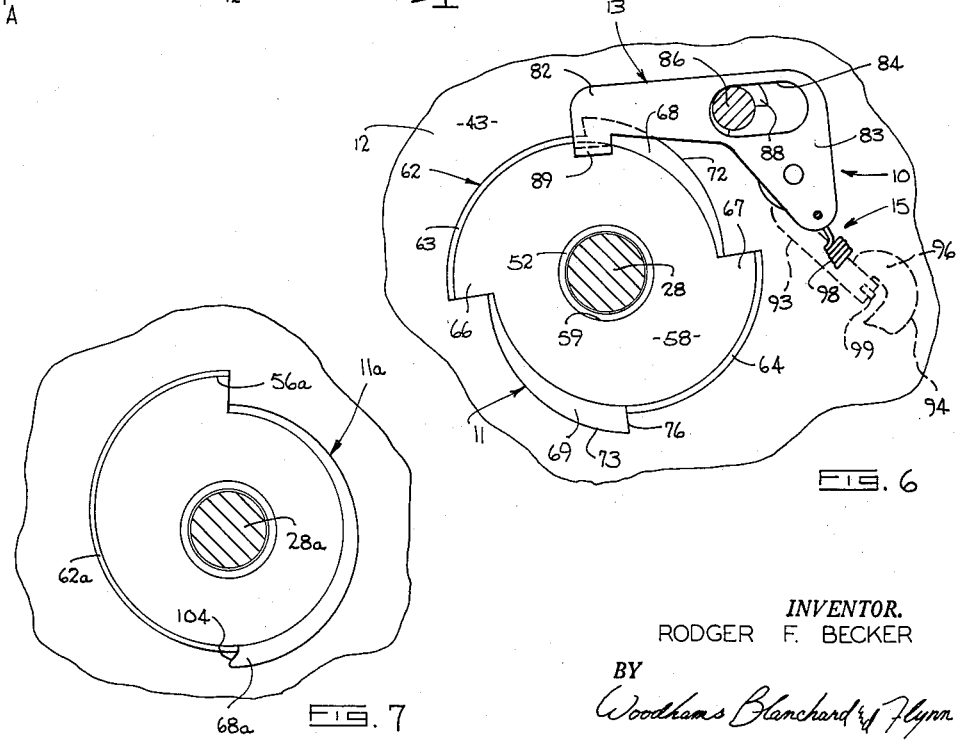
INVENTOR.
RODGER F. BECKER
BY
Woodhams Blanchard & Flynn
ATTORNEYS 2,969,932
REEL LOCK WITH QUICK RELEASE Rodger F. Becker, Kalamazoo, Mich., assignor to Aero-Motive Manufacturing Company, Kalamazoo, Mich., a corporation of Michigan Filed Nov. 6, 1959, Ser. No. 851,365

6 Claims. (Cl. 242—107.7)

This invention relates in general to a locking mechanism for a spring biased reel and, more particularly, to a type thereof including a ratchet mechanism whereby said reel can be positively held against rotation by said spring but can be quickly released for such rotation.

A great many devices have been provided for the purpose of holding a spring biased cord reel against rotation by its spring after a selected amount of cord or the like has been unwound from the reel. Moreover, numerous attempts have been made to devise a mechanism, often referred to as a cord reel lock, which operates in response to an appropriate manipulation of the cord to effect a rewinding of the cord on the reel. Two such lock mechanisms are disclosed in my Patent No. 2,698,146 and my patent application Ser. No. 745,365, filed June 20, 1958.

Heretofore, and as disclosed in the above-mentioned patent and patent application, release of a cord reel lock for the purpose of rewinding the cord has usually required special rotational movement and/or positioning of the cord reel with respect to the cord reel housing. Such movement or positioning has, for example, been accomplished by pulling the cord a selected distance, or at a selected speed, until the reel rotates a certain amount, produces a characteristic sound or gives a visual signal which indicates that the lock has been released and that rewinding will occur if the cord is released. In many instances, no signal is provided so that several unsuccessful attempts often precede the release of the lock mechanism. Moreover, working conditions may render any form of signal useless and make careful manipulation of the cord difficult at best.

The structures disclosed in this patent application have been developed, at least to a substantial extent, in a continuing effort to (1) eliminate the difficulty previously encountered in releasing the cord reel from its locked position, whereby the cord is automatically rewound upon the cord reel, and (2) for minimizing the amount of movement of the cord required to effect such release. The need for reducing the amount of movement in the cord reel required to effect such a release has developed from circumstances where, for example, the cord reel is being used in such a way that the load, hence the cord supporting the load, cannot be moved more than a very small amount in the unwinding direction in order to effect a release of the cord reel lock. By way of example, this minimum movement condition often arises when the load on the cord of the cord reel is very heavy and is suspended over an object which prohibits further downward movement of the load. A similar problem may arise when the cord is fully extended or unwound and there is insufficient cord remaining on the reel to effect a release by further unwinding. With respect to the latter situation, it has sometimes been necessary with existing cord reels to disassemble the reel housing in order to release manually the cord reel lock.

Accordingly, a primary object of this invention has been the provision of a lock mechanism for a spring biased cord reel, which mechanism is so arranged that it can be operated entirely and remotely simply by causing the cord to rotate the reel and especially, wherein release of the lock mechanism can be effected by a very small movement of the cord, hence the cord reel, in the unwinding direction, regardless of the amount of cord which has been unwound and regardless of where the cord is secured to the drum of the reel.

A further object of this invention has been the provision of a cord reel lock mechanism, as aforesaid, wherein the lock mechanism can be released substantially instantaneously without any reference to the cord reel, or to any sounds or other signals produced thereby, simply by pulling firmly upon the cord with sufficient force to move the cord in even the slightest amount in the unwinding direction.

A further object of this invention has been the provision of a reel lock mechanism, as aforesaid, which is positive in operation, which is very durable in construction, which requires a small and generally immaterial amount of space, and which is much easier and far more convenient to operate than existing mechanisms for similar purposes.

A further object of this invention has been the provision of a reel lock mechanism, as aforesaid, which requires little or no maintenance, which is inexpensive to fabricate and which is especially well adapted for use with and within the housing containing a cord reel.

Other objects and purposes of this invention will become apparent to persons familiar with this type of equipment upon reading the following specification and examining the accompanying drawings, in which:

Figure 1 is a central, cross sectional view of a cord reel indicated by the cutting line I—I in Figure 2 and embodying the lock mechanism of the invention.

Figure 2 is a sectional view taken along the line II—II in Figure 1.

Figure 3 is a fragment of Figure 2 showing the cord reel lock mechanism in a different position of operation.

Figure 4 is a fragment of Figure 2 showing said cord reel lock mechanism in a further position of operation.

Figure 5 is a sectional view of said reel lock mechanism taken along the line V—V in Figure 2.

Figure 6 is a sectional view substantially as taken along the line VI—VI in Figure 1.

Figure 7 is a fragment of Figure 6 showing a modified structure.

For convenience in description, the terms "inner," "outer," derivatives thereof and words of similar import will have reference to the geometric center of the cord reel structure appearing in Figures 1 and 2, and parts, including the cord reel lock mechanism, associated therewith. The terms "upper," "lower," derivatives thereof and words of similar import will have reference to the cord reel lock mechanism when it is in its normal position of operation, as shown in Figures 1, 2 and 4.

*General description*

The objects and purposes of this invention, including those set forth above, have been met by providing a cord reel rotatably supported upon and within a cord reel housing containing a spring for resiliently urging rotation of said cord reel in one direction with respect to said housing. A cord reel lock mechanism, which is associated with the reel and reel housing, includes a ratchet member, a pawl and a toggle device. The ratchet member is coaxially secured, for example, to one axial end of the reel. The pawl is pivotally and slidably supported upon the reel housing and includes a cam follower engageable with said ratchet member for positively, but releasably, opposing rotation of said ratchet member, hence said reel, in said one direction. The toggle device, which is connected between the housing and the pawl, effects movement of the pawl, hence the cam follower, into or out of engagement with the peripheral edge of said ratchet member and a cam thereon. The ratchet and pawl are arranged so that engagement therebetween, which prevents rotation of the reel in a winding direction, automatically operates the toggle device whereby the pawl is positioned so that a very slight movement of the reel in an unwinding direction with respect to the reel housing permits the pawl to move out of engagement with the ratchet and its cam. Thereafter, the reel is then free, in as far as the pawl and ratchet member are concerned, to rotate in the winding direction in response to the urging of the spring connected between the reel and the reel housing.

Detailed Construction

The reel lock 10 (Figures 2 and 6,) which has been selected to illustrate a preferred embodiment of this invention, is comprised of a ratchet wheel 11 which, by way of example, is coaxially secured to the cord reel 12, and a pawl 13 which, accordingly, is mounted upon the cord reel housing 14. It will be apparent, however, that this particular arrangement may, under some circumstances, be advantageously reversed. A toggle device 15 is connected between the pawl 13 and housing 14 to effect movement of the pawl in response to movement of the ratchet wheel 11.

The reel housing 14 (Figure 1) may be of a substantially conventional type having a pair of side walls 17 and 18 and a peripheral wall 19, which is preferably cylindrical and has a tangentially disposed and integral guide nozzle 21 through which the cord 22 extends. The side walls 17 and 18 have coaxial shaft openings 23 and 24 through which the threaded end portions 26 and 27 of the shaft 28 are slidably received. The threaded end portions 26 and 27 are preferably of reduced diameter to provide shoulders 31 and 32 which bear against the inner surfaces of the end walls 17 and 18. Nuts 33 and 34 are threadedly engaged with the end portions 26 and 27 for clamping the end walls 17 and 18 against the shoulders 31 and 32, whereby relative rotation between the shaft 28 and housing 14 is prevented. A hanger device 35 may be secured to the peripheral wall 19 of the housing 14 for supporting same.

The reel 12 (Figure 1) is formed, in this particular embodiment, from a pair of substantially cup-shaped members 37 and 38 having coaxial peripheral walls 41 and 42, respectively, which are of equal diameter and form the cord drum 40. Said members 37 and 38 also have adjacent center walls 43 and 44, which are secured together, and radially outwardly extending flanges 46 and 47 which co-operate with the drum 40 to confine the cord 22 supported thereon. The various connections and securements described herein may be made in any conventional manner, such as by welding, riveting or the like. The peripheral wall 41 (Figure 2) is provided with an opening 49 in which one end of the cord 22 may be anchored.

The center walls 43 and 44 on the reel 12 (Figure 1) have central openings in which a bearing 52 is rigidly mounted for rotatably engaging the shaft 28 and partially supporting said reel 12 thereon. A circular cover plate 53, which is secured to the outer surface of the flange 49, combines with the peripheral wall 42 and the center wall 44 to define a spring chamber 54. The cover plate 53 has a central opening in which a bearing 56 is secured for rotatably engaging the shaft 28 and thereby assisting the bearing 52 to support the reel 12 on said shaft. A coil spring 57, which encircles the shaft 28 within the spring chamber 54, is secured at its inner end to said shaft 28 and is secured at its outer end to the peripheral wall 42, in a substantially conventional manner. The spring 57 is so mounted within the spring chamber 54 that movement of the reel 12 in a counter-clockwise direction, as appearing in Figure 2, causes the spring 57 to be wound more tightly upon the shaft 28.

The ratchet wheel 11 is a substantially cup-shaped member (Figures 1 and 6) having a flat end wall 58 which is secured to the center wall 43 of the cup-member 37 and is disposed within the zone defined by the peripheral wall 41. The end wall 58 has a central opening 59 which encircles and snugly embraces the adjacent end of the bearing 52. The ratchet wheel 11 also has a peripheral wall 62 which, in this particular embodiment, is comprised of two, substantially semi-cylindrical portions 63 and 64 which are diametrically offset. The portions 63 and 64 preferably, but not necessarily, define identical spirals around the axis of the shaft 28. The offset relationship between the portions 63 and 64 produces two openings 66 and 67 in, and on diametrically opposite sides of, the peripheral wall 62, which openings face circumferentially in the winding direction of rotation of the reel 12, as shown in Figure 1.

The ratchet wheel 11 (Figures 1 and 6) has a pair of cams 68 and 69 which are integral with and extend radially from the free edges of the portions 63 and 64, respectively, of the peripheral wall 62. The cams 68 and 69 (Figures 2 and 6) have arcuate cam edges 72 and 73, respectively, which extend divergently with the portions 63 and 64, respectively, from the openings 66 and 67 to points approximately midway between said openings. The end edges 75 and 76 of said cams 68 and 69 are substantially radially disposed and are located on diametrically opposite sides of the shaft 28. However, it will be apparent that the precise location of the end edges 75 and 76 with respect to each other and with respect to the openings 66 and 67 may be varied substantially without departing from the scope of the invention.

The pawl 13 is a substantially L-shaped member having a substantially horizontal arm 82 and a substantially vertical arm 83. Said pawl 13 also has a pivot opening 84 near the intersection of said arms which is elongated lengthwise of and into the horizontal arm 82. A pivot pin 86 (Figures 2 and 5) is rigidly secured to the side wall 17 at a point spaced radially outwardly from the shaft 28 a distance greater than the maximum radial extent of the ratchet wheel 11. The pivot pin 86 has an outer end portion 87 of reduced diameter which is slidably and pivotally disposed within the elongated pivot opening 84. The pin 86 is engaged by a spring clip 88 for holding the pawl 13 upon the pin 86 and substantially within a plane which is preferably disposed about midway between and parallel with the side wall 17 and the plane defined by the cams 68 and 69, as shown in Figure 1.

The horizontal arm 82 on the pawl 13 has an integral, sidewardly projecting cam follower 89 which extends through the plane defined by the cams 68 and 69 and, therefore, into the path of the end edges 75 and 76 thereon. A boss 92 on the side wall 17 slidably engages and guides the outer end of the arm 82 and thereby prevents movement of the cam follower 89 in a direction axially of the shaft 28 out of the path of the cams 68 and 69.

The toggle device 15 (Figure 2) is comprised of a toggle bar 93, which is pivotally supported upon the end wall 17 at a point substantially beneath the vertical arm 83 of the pawl 13 and adjacent to the maximum radial extent of the ratchet wheel 11. A substantially U-shaped stop member 94 is secured to the side wall 17 and has a pair of spaced stop arms 96 and 97 which are disposed on opposite sides of the toggle bar 93 and arranged to limit the pivotal movement of said toggle bar.

A resilient element, such as the spiral spring 98 (Figures 2 and 3), is pivotally secured at its opposite ends to, and extends between, the lower end of the vertical arm 83 and the spring engaging pin 99 on the lower, free end of the toggle bar 93. The pivot axis of the toggle bar 93 (Figure 2) and the stop member 94 are located with respect to each other and the pin 86 so that the toggle bar 93 is against the outer stop arm 96, the spring 98 will urge the pawl 13 toward and into a position, similar to that shown in Figure 2, wherein the cam follower 89 will occupy a position between and spaced from the concentric circles defined by the innermost and outermost points on the peripheral wall 62. Thus, the cam follower 89 will be engageable by the end edges 75 and 76 and receivable through the openings 66 and 67 when the toggle device 15 is in its Figure 2 position.

When the toggle bar 93 is against the inner stop arm 97, the spring 98 will urge the pawl 13 toward and into the position of Figure 4 wherein the cam follower 89 is disposed radially outwardly of the maximum radial extent of the cam edges 72 and 73.

The elongated pivot opening 84 is arranged so that toggle bar 93 is moved from its solid line position in Figure 2 into its broken line position 93a when the pawl 13 is moved from its Figure 2 position to its Figure 3 position by the ratchet wheel 11.

An actuating roller 103 (Figure 2) is supported upon the vertical arm 83 of the pawl 13 between the pivot opening 84 and the spring 98 for rotation around an axis parallel with the axis of the pivot pin 86. The entire roller 103 is disposed radially outwardly of the circle defined by the maximum radial extent of the ratchet wheel 11 when the toggle bar 93 is against the stop arm 96 and the pawl 13 is, therefore, in its ratchet engaging position. However, when the pawl 13 (Figure 4) is out of its ratchet engaging position, the roller 103 is engageable by the peripheral wall 62 or the cams 68 and 69, whereby the vertical arm 83 is moved radially away from the shaft 28 a sufficient distance to cause the toggle bar 93 to be moved from its broken line position 93a in the Figure 2 to its solid line position.

Operation

The cord reel assembly C (Figures 1 and 2) is usually suspended by means including the hanger device 35 near the place of its intended use. When the reel is not in use, the cord 22 is generally wound upon the drum 40, except for a small portion thereof which extends through the guide nozzle 21 and is connected in a conventional manner to an article A, such as a tool. The cam follower 89 on the pawl 13 (Figure 6) will, as a general rule, be disposed within the zone defined by the peripheral wall 62 of the ratchet 11. With the cam follower 89 inside of the peripheral wall 62 (Figure 6), the toggle bar 93 will be held by the spring 98 against the outer arm 96 of the stop member 94.

When it becomes desirable to use the tool A, the cord 22 is unwound from the reel 12 simply by engaging and pulling the cord 22 or article A away from the cord reel assembly C, whereby the reel 12 and the ratchet wheel 11 (Figure 2) are rotated in a counterclockwise direction. As the cord 22 is pulled out of the housing 14 through the nozzle 21, the inner surface of the peripheral wall 62 (Figure 6) moves past the cam follower 89 until the cam follower passes through one of the openings 66 and 67 in said wall. Thus, since these openings are 180 degrees apart, clockwise rotation of the reel 12 (Figure 6), hence of the ratchet wheel 11, through not more than approximately 180 degrees, will cause the cam follower 89 to move from its inner path within the wall 62 outwardly into its outer path on the outer side of the peripheral wall 62. Moreover, if the reel 12 is rotated in this clockwise or unwinding direction through an angle of more than 270 degrees, the cam follower 89 must pass at least one edge 75 or 76, whereby locking can be effected by permitting a winding rotation of the reel. Obviously, this degree of unwinding to ensure locking can be reduced, for example, by increasing the number of openings 66 and cams 68.

When the desired amount of cord 22 (Figure 2) has been unwound from the reel 12, the rewinding of such cord can be prevented by operation of the reel lock 10. More specifically, the tension on the cord 22 is released so that the reel 12 can be moved in a clockwise direction in Figure 2 by spring 57 (Figure 1). If the cam follower 89 is in engagement with the peripheral wall 62, and not with one of the cam edges 72 and 73, such rewinding rotation of the reel 12 will stop in not more than a quarter turn by engagement of the follower 89 with one of the end edges 75 and 76 on the ratchet wheel 11. However, if the follower 89 is engaged with one of the cam edges 72 and 73, said cam follower will move through one of the openings 66 and 67 where it is unable to stop the rewinding rotation of the reel. This fact will become apparent if the reel 12 rotates more than a quarter turn in the rewinding direction. Accordingly, if the reel is not locked by a quarter turn in the rewind direction, the cord 22 may be pulled out of the cord reel assembly C slightly further than it was before so that the cam follower 89 can drop over the end edge on the cam with which it is engaged. Thereafter, a release of the tension on the cord 22 will cause the follower 89 to engage said end edge, such as the end edge 75 shown in Figure 2.

Because of the tension upon the reel spring 57, engagement between the cam follower 89 and the end edge 75, for example, will cause the pawl 13 to be moved rightwardly from its Figure 2 position into its Figure 3 position where the pivot pin 86 is in the leftward end of the elongated pivot opening 84. This causes the toggle bar 93 to be moved rightwardly into its broken line position 93a of Figure 2 so that the spring 98 applies a counterclockwise torque to the pawl 13. However, this counterclockwise torque is overpowered by the frictional engagement between the end edge 75 and the cam follower 89 so that the cam follower 89 and the pawl 13 will remain in the Figure 3 position until acted upon by some further force. Under some circumstances, it may be desirable to undercut the cam edges 75 and 76, as shown at 104 in Figure 7 with respect to the cam 68a, in order to provide a more positive gripping.

When it becomes desirable to release the reel lock 10, as for the purpose of rewinding the cord 22, said cord is pulled away from the reel assembly C until the friction between the follower 89 and the end edge 75 becomes less than the tension in spring 98, whereupon the pawl 13 is moved into its Figure 4 position. Ordinarily, such release of the reel lock will require the application of a substantial pulling force to the cord 22, in order to overpower the opposing force created by the tension in the spring 57. However, the reel lock 10 will normally be released by a very small rotational movement of the reel 12, hence by a very small lengthwise movement of the cord 22. For example, release can be effected by a rotation of less than 5 degrees, but it may be slightly more than 5 degrees if desired. When the cam follower 89 is released by the lock edge 75, the counterclockwise torque being applied to the pawl 13 by the spring 98 will pivot the pawl 13 into its Figure 4 position, thereby completely disengaging the cam follower 89 from the ratchet wheel.

If the reel lock 10 is released, as discussed above, to rewind part of the cord, for example, the tension on the cord 22 can be released as soon as the lock is released. The pawl 13 being in the Figure 4 position, clockwise or rewinding rotation of the reel 12 will cause one of the portions 63 and 64 to engage the actuating roller 103 and thereby pivot the pawl 13 back into its Figure 2 position, whereby the toggle bar 93 is moved from its broken line position 93a into its solid line position. At the moment that one of the portions 63 and 64 engages the roller 103, the cam follower 89 will be radially aligned with a cam edge 72 or 73. Accordingly, continued clockwise rotation of the reel 12 will cause the cam follower 89 to be received through the next adjacent opening 66 or 67 in the peripheral wall 62, whereby said cam follower will move inside of the peripheral wall 62, as shown in Figure 6. The follower 89 will remain inside of the peripheral wall as long as the counterclockwise rotation continues.

If it becomes desirable to stop the rewinding rotation of the reel 12 at a point short of completely rewinding the cord 22, the reel 12 is stopped by the cord 22 and rotated in a counterclockwise direction, as appearing in Figure 2, until the cam follower 89 moves out through one of the openings 66 and 67 and passes over a cam edge 72 or 73 for engagement with an end edge 75 or 76, in substantially the same manner as set forth above with respect to the initial operation of the cord reel assembly C.

It will be observed from the above description that the amount of unwinding rotation of the reel which is required to release the reel lock 10 can always be less than the amount of rotation of the reel which is required to move the pawl 13 from its Figure 2 position to its Figure 3 position, during the locking operation. Accordingly, where the reel lock 10 is fabricated according to the teachings of this invention, it is impossible by pulling on the cord 22, to move the reel 12 into a locked position which cannot be released by again pulling on the same cord 22. Moreover, and as a result of this feature, the cord 22 can be secured to the cord reel drum 40 at any point thereon without any regard to the position which such point will assume when the reel 12 is in the locked position.

At least some of the objects of the invention may be met by using a ratchet wheel 11a (Figure 7) having a peripheral wall 62a defining a single, spiral curve extending through an angle of approximately 360 degrees around the shaft 28a. The radial offset at the adjacent ends of the wall 62a provides a single circumferentially facing opening 66a between the inner and outer surfaces of the wall 62a. A single cam 68a which is integral with and projects radially outwardly from the wall 62a, extends from said opening 66a about half way around and divergently with said wall 62a. The cam 68a has an end edge 75a which is preferably disposed on the diametrically opposite side of said wall 62a from the opening 66a. Operation of the ratchet wheel 11a is basically the same as the operation of the wheel 11, except the wheel 11a may require more rotation to effect a locking action. It follows from this that, by increasing the number of cams 68 and openings 66, the number of locking positions can be increased.

Although a particular preferred embodiment of the invention has been disclosed above in detail for illustrative purposes, it will be understood that variations or modifications of such disclosure, which lie within the scope of the appended claims, are fully contemplated.

What is claimed is:

1. In an apparatus of the character described, the combination comprising: a reel housing; a reel rotatably supported within said housing and means resiliently urging rotation of said reel in one rotational direction with respect to said housing; arcuate wall means on one of said reel and said housing defining radially spaced and concentric inner and outer paths, said wall means having a separation therein; stop means fixed with respect to said wall means and disposed within the outer path, said stop means being spaced from said separation; an element movably supported upon the other of said reel and said housing for movement radially of said reel between a position within the inner path and a position radially outwardly of the outer path, said element being movable through the separation in said wall means; and means including a device connected between said element and the other of said reel and said housing for urging said element between a position in said outer path and said position outwardly thereof in response to rotational movement of said reel.

2. In apparatus of the character described, the combination comprising: support structure; a member rotatably mounted upon said support structure and means urging rotation of said member in one rotational direction; arcuate wall means fixed with respect to said member and defining the periphery of an annular zone surrounding the rotational axis of said member, said wall means being spaced substantially from said axis and having an offset therein providing a tangentially disposed opening through said wall means and facing in said rotational direction; a cam fixed with respect to said wall means and extending radially outwardly therefrom, said cam having a radially disposed edge facing in said rotational direction and spaced from said opening in said wall means; a cam follower pivotally and slidably mounted upon said support structure for movement radially of said member into and out of a position for engagement with said radial edge; means connected to said cam follower and engageable by said member for urging said cam follower into and out of said position in response to rotational movement of said member.

3. In a lock mechanism for a cord reel rotatably mounted upon a support structure and having spring means urging rotation of said reel in one direction, the combination comprising: substantially spiral wall means arranged on one of said reel and said support structure around and spaced radially from the rotational axis of said member, said wall means having a circumferential opening adjacent to the outer end of said spiral and facing in said one direction of rotation; a substantially spiral cam extending radially outwardly from said wall means and diverging with said wall means in said one direction of rotation, said cam having a radial edge spaced a substantial distance from the opening in said wall means; a cam follower pivotally supported upon the other of said member and said support structure for movement radially of said rotational axis into and out of a position of engagement by the radial edge of said cam; and means including a device connected between said cam follower and the other of said member and said support structure for effecting said movement of said cam follower in response to a rotational movement of said member.

4. A quick release lock for a cord reel rotatably mounted within a housing and having spring means urging rotation of said reel in one rotational direction, comprising: a pair of substantially semi-cylindrical walls secured to said reel and defining an annular zone around said shaft, the axes of said walls being equally distant from, parallel with and on diametrically opposite sides of the rotational axis of said reel, whereby the adjacent ends of said walls are offset radially to define a pair of circumferential openings in said walls facing in said direction of rotation; a pair of substantially spiral cams projecting radially outwardly from said walls, said cams extending from said openings in said direction of rotation to points approximately midway between said openings, each cam having a radially disposed edge at said midway point; a cam follower pivotally and slidably supported upon said housing for movement tangentially and radially of said walls; a toggle device connected between said cam follower and said housing for movement between a first position, whereby said cam follower is resiliently held for engagement by said radial edge and reception into one of said openings, and a second position whereby said cam follower is resiliently held radially outwardly of said member, tangential movement of said cam follower by said radial edge causing said toggle device to move from said first position into said second position; and means on said cam follower engageable by said walls when said toggle device is in said second position for moving said toggle device from said second position into said first position in response to rotation of said reel.

5. The structure of claim 4 wherein said cam follower comprises a flat member having a cam engaging finger extending sidewardly therefrom, said flat member having an elongated opening therethrough and extending toward said finger; wherein a pivot pin is secured to said housing and is slidably received through said opening; wherein said toggle device includes a bar pivotally mounted near one end upon said housing, the other end of said bar extending away from said pivot pin, resilient means connected between the other end of said toggle bar and an adjacent portion of said flat member, and stop means on said housing for engaging the other end of said toggle bar when said toggle device is in said positions.

6. In an apparatus of the character described, the combination comprising:

a reel support;

a reel rotatably supported upon said reel support and means resiliently urging rotation of said reel in one rotational direction with respect to said reel support;

arcuate wall means on one of said reel and said reel support defining radially spaced and substantially concentric, first and second paths, said wall means having a discontinuity therein;

stop means fixed with respect to said wall means and disposed within said second path, said stop means being spaced from said discontinuity;

an element movably supported upon the other of said reel and said reel support for movement radially with respect to said reel between a first position within the first path and a second position radially spaced from the first and second paths, said first and second positions being on the opposite radial sides of said second path, said element being movable through the discontinuity in said wall means and through an intermediate position in said second path as said element moves between said first and second positions; and means including a movable device connected between said element and the other of said reel and said reel support for urging said element between said intermediate position in said second path and said second position in response to rotational movement of said reel with respect to said reel support.

No references cited.